United States Patent
Fouda (10) Patent No.: US 11,520,072 B2
(45) Date of Patent: Dec. 6, 2022

(54) ELECTROMAGNETIC PIPE INSPECTION IN NON-NESTED COMPLETIONS

(71) Applicant: Halliburton Energy Services, Inc., Houston, TX (US)

(72) Inventor: Ahmed Elsayed Fouda, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 397 days.

(21) Appl. No.: 16/780,417

(22) Filed: Feb. 3, 2020

(65) Prior Publication Data
US 2021/0239874 A1    Aug. 5, 2021

(51) Int. Cl.
*G01V 3/38* (2006.01)
*G01B 7/06* (2006.01)
*G01B 7/13* (2006.01)
*G01N 27/72* (2006.01)
(Continued)

(52) U.S. Cl.
CPC ............... *G01V 3/38* (2013.01); *G01B 7/10* (2013.01); *G01B 7/13* (2013.01); *G01N 27/041* (2013.01); *G01N 27/72* (2013.01); *G01V 3/12* (2013.01)

(58) Field of Classification Search
CPC .......... G01B 7/10; G01B 21/045; G01B 7/13; G01V 3/12; G01V 3/38; G01V 3/10; E21B 47/006; E21B 2200/20; E21B 47/085; G01N 27/9006; G01N 27/9026; G01N 27/9046; G01N 27/041; G01N 27/72
See application file for complete search history.

(56) References Cited

U.S. PATENT DOCUMENTS

| 9,715,034 | B2 | 7/2017 | Omeragic et al. |
| 2002/0035437 | A1 | 3/2002 | Tingley |
| 2016/0160629 | A1 | 6/2016 | Donderici et al. |

(Continued)

FOREIGN PATENT DOCUMENTS

WO    2016-007642    1/2016

OTHER PUBLICATIONS

International Search Report and Written Opinion for Application No. PCT/US2020/019792, dated Nov. 2, 2020.

(Continued)

*Primary Examiner* — Jay Patidar
(74) *Attorney, Agent, or Firm* — John Wustenberg; C. Tumey Law Group PLLC (57) ABSTRACT

A method and system for estimating parameters of pipes. The method may comprise disposing an electromagnetic (EM) logging tool into a pipe string, creating a log from a first set of one or more measurements, and creating a synthetic model of one or more nested pipes based at least in part on a well plan. The method may further comprise adding a modeled pipe to the synthetic model, estimating one or more parameters of the modeled pipe through model calibration to form a calibrated model, and performing an inversion with the calibrated model to estimate one or more pipe parameters of the pipe string. The system may comprise an electromagnetic logging tool that may comprise a transmitter, wherein the transmitter is a first coil and is operable to transmit an electromagnetic field, and a receiver, wherein the receiver is a second coil and is operable to measure the electromagnetic field.

20 Claims, 7 Drawing Sheets

(51) Int. Cl.
  *G01N 27/04*    (2006.01)
  *G01V 3/12*     (2006.01)

(56) References Cited

U.S. PATENT DOCUMENTS

| 2017/0101865 A1 | 4/2017 | Khalaj Amineh et al. |
| 2017/0176629 A1 | 6/2017 | Omeragic et al. |
| 2018/0106764 A1* | 4/2018 | Fouda ................ G01N 27/9086 |

OTHER PUBLICATIONS

Omar, S., & Omeragic, D. (2017). Inversion-based workflow for oilfield nested multicasing evaluation using electromagnetic low-frequency measurements.
Schlumberger, Pipe Scanner, Technology Applications, Dennis Denney, JPT Senior Technology Editor, Jan. 2010.
IPTC, Successful Application of a New Electromagnetic Corrosion Tool for Well Integrity Evaluation in old wells completed with Reduced Diameter Tubular, Garcia, et al., IPTC16997, 2013.
Halliburton, Electromagnetic Pipe Xaminer® V (EPX™ V) Service, H012406, May 2019.
TGT, Multi Tube Integrity.

* cited by examiner

ELECTROMAGNETIC PIPE INSPECTION IN NON-NESTED COMPLETIONS

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, an EM logging tool may collect data on pipe thickness to produce an EM log. The EM log data may be interpreted to determine the condition of production and inter mediate casing strings, tubing, collars, filters, packers, and perforations. When multiple non-nested casing strings are employed together, correctly managing corrosion detection EM logging tool operations and data interpretation may be complex.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to methods for identifying artifacts with an electromagnetic logging tool in a non-nested tubing configuration within a wellbore. Electromagnetic (EM) sensing may provide continuous in situ measurements of parameters related to the integrity of pipes in cased boreholes. As a result, EM sensing may be used in cased borehole monitoring applications. EM logging tools may be configured for identifying artifacts on a casing from two or more non-nested pipes encircled by multiple concentric pipes (e.g., for one or more), such as casings, with the first pipe diameter varying (e.g., from about two inches to about seven inches or more).

EM logging tools may measure eddy currents to determine metal loss and use magnetic cores with one or more coils to detect defects in multiple concentric pipes. The EM logging tools may use pulse eddy current (time-domain) and may employ multiple (long, short, and transversal) coils to evaluate multiple types of defects in double pipes. It should be noted that the techniques utilized in time-domain may be utilized in frequency-domain measurements. In examples, EM logging tools may operate on a conveyance. Additionally, EM logging tools may include an independent power supply and may store the acquired data on memory.

Monitoring the condition of the production and intermediate casing strings is crucial in oil and gas field operations. EM eddy current (EC) techniques have been successfully used in inspection of these components. EM EC techniques consist of two broad categories: frequency-domain EC techniques and time-domain EC techniques. In both techniques, one or more transmitters are excited with an excitation signal, and the signals from the pipes are received and recorded for interpretation. The magnitude of a received signal is typically proportional to the amount of metal that is present in the inspection location. For example, less signal magnitude is typically an indication of more metal, and more signal magnitude is an indication of less metal. This relationship may allow for measurements of metal loss, which typically is due to an anomaly related to the pipe such as corrosion or buckling.

In case of multiple non-nested pipe stings creating an electromagnetic model, such as those with dual completion, is a challenging task since the presence of non-nested pipes breaks the axial symmetry of the model, and therefore necessitates the use of two dimensional ("2-D") or three dimensional ("3-D") numerical models rather than the semi-analytical radial one dimensional ("1-D") models that could have been used otherwise. In addition, the use of 2-D model may cause the inversion to be prohibitively slow for any practical application. Existing methods for pipe inspection in dual completion tend to ignore the signals from the adjacent non-nested tubing(s) and use a simplified radial 1-D model in the inversion. A radial 1-D model assumes axial-symmetric geometry, and therefore cannot model cases with non-nested pipes. In examples, the radial 1-D model may illustrate radial measurements in a 1-D plane that may be reviewed by an individual. This simplification could compromise the accuracy of metal loss estimation on outer casings and could lead to misjudgment on the integrity of the pipes. Methods and system described below overcome current technology deficiencies with non-nested pip strings to form a 1-D model that accurately determines metal loss or gain in the non-nested pipe strings and casings that may surround the non-nested pie strings.

Figure 1:
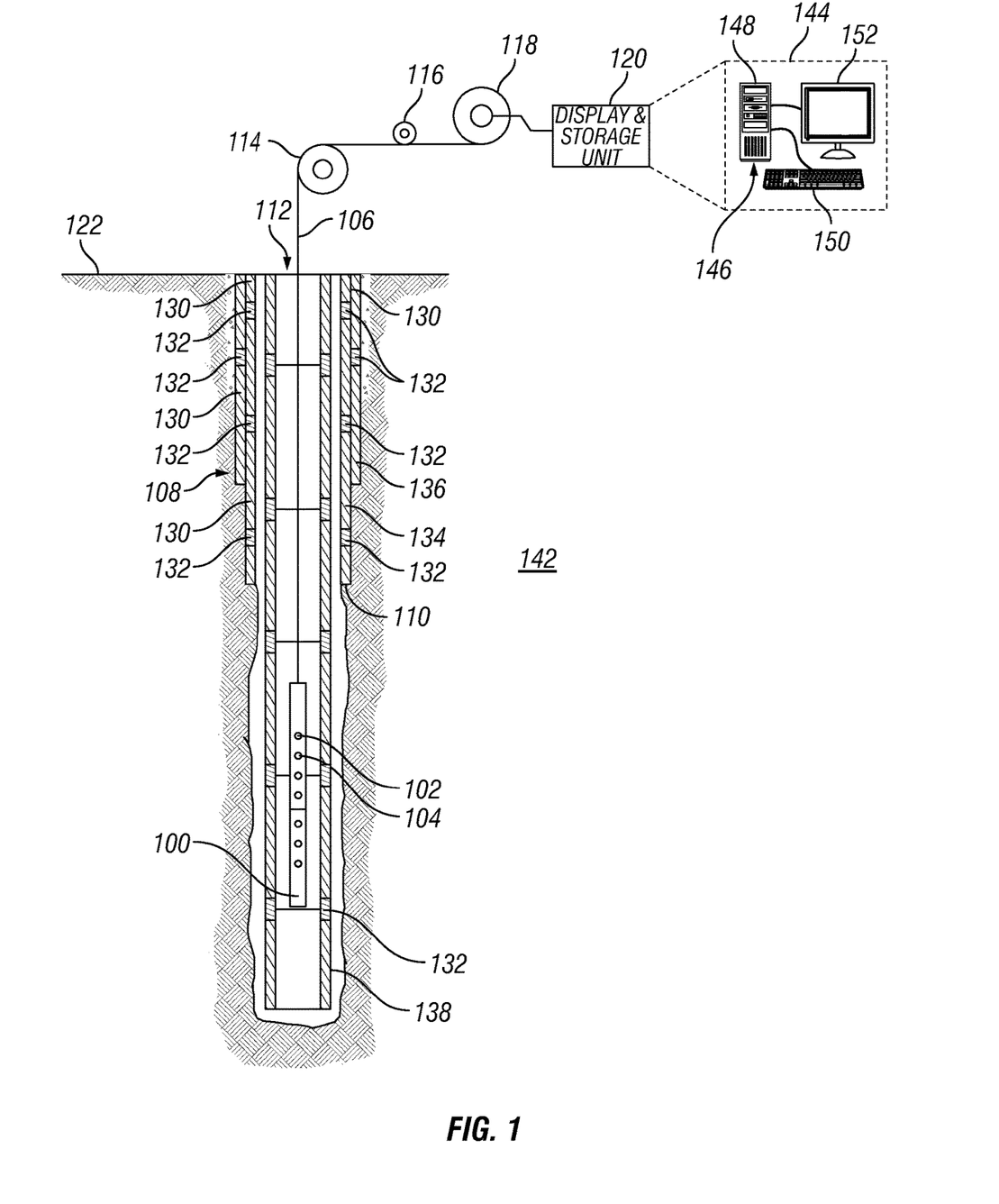
FIG. 1 illustrates an example of an EM logging tool disposed in a wellbore.

FIG. 1 illustrates an operating environment for an EM logging tool 100 as disclosed herein in accordance with some embodiments. EM logging tool 100 may comprise a transmitter 102 and/or a receiver 104. In examples, transmitters 102 and receivers 104 may be coil antennas. Furthermore, transmitter 102 and receiver 104 may be separated by a space between about 0.1 inches (0.254 cm) to about 200 inches (508 cm). In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104 or vice versa. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the EM logging tool 100, a digital telemetry system may be employed, wherein an electrical circuit may be used to both supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within the downhole tool assembly, and/or the data provided by EM logging tool 100 may be stored within the downhole tool assembly, rather than transmitted to the surface during logging (corrosion detection).

During operations, transmitter 102 may broadcast electromagnetic fields into subterranean formation 142. It should be noted that broadcasting electromagnetic fields may also be referred to as transmitting electromagnetic fields. The electromagnetic fields from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed and/or measured with the primary electromagnetic fields by receivers 104. Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by the transmitter 102 and the sensing and/or measuring of secondary electromagnetic fields by receivers 104 may be controlled by display and storage unit 120, which may include an information handling system 144. As illustrated, the information handling system 144 may be a component of the display and storage unit 120. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be sensed and/or measured by receivers 104 placed at some distance on the EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. In examples, a remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}\, t \qquad (1)$$

and the magnitude of the impedance shows the dependence:

$$\exp\left[-2\left(\sqrt{\frac{\omega\mu\sigma}{2}}\right)t\right] \qquad (2)$$

where $\omega$ is the angular frequency of the excitation source, $\mu$ is the magnetic permeability of the pipe, $\sigma$ is the electrical conductivity of the pipe, and t is the thickness of the pipe. By using the common definition of skin depth for the metals as:

$$\delta = \sqrt{\frac{2}{\omega\mu\sigma}} \qquad (3)$$

The phase of the impedance varies as:

$$\varphi \cong 2\frac{t}{\delta} \qquad (4)$$

and the magnitude of the impedance shows the dependence:

$$\exp\left[\frac{-2t}{\delta}\right] \quad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
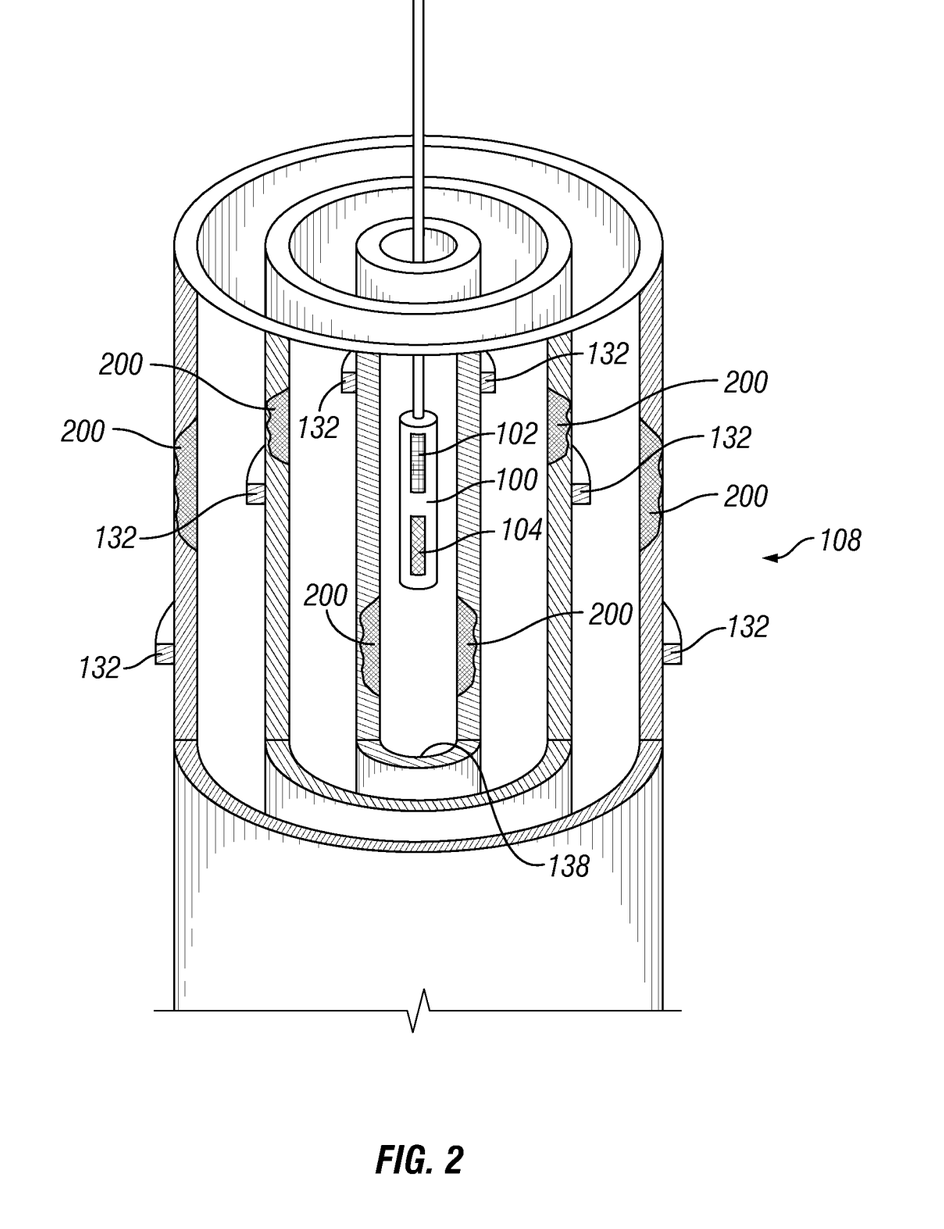
FIG. 2 illustrates an example of arbitrary defects within multiple pipes.

FIG. 2 shows EM logging tool 100 disposed in pipe string 138 which may be surrounded by a plurality of nested pipes (i.e. first casing 134 and second casing 136) and an illustration of anomalies 200 disposed within the plurality of nested pipes in accordance with some embodiments. As EM logging tool 100 moves across pipe string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing, and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. It should be noted that inversion methods may include model-based inversion which may include forward modeling, misfit inversions, cost function inversion, and/or the like. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet). Due to these complications, methods may need to be used to accurately inspect pipe features.

FIGS. 3A-3E illustrates an electromagnetic inspection and detection of anomalies 200 (i.e. defects) or collars 132 (e.g., Referring to FIG. 2) in accordance with some embodiments. As illustrated, EM logging tool 100 may be disposed in pipe string 138, by a conveyance, which may comprise any number of concentric pipes. As EM logging tool 100 traverses across pipe 300, one or more transmitters 102 may be excited, and a signal (mutual impedance between transmitter 102 and receiver 104) at one or more receivers 104, may be recorded. Due to eddy currents and electromagnetic attenuation, pipe 300 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly, by inspecting the signal loss, it may be possible to identify metal gain such as due to presence of a casing collar 132 (e.g., Referring to FIG. 1) where two pipes meet with a threaded connection. In order to distinguish signals from different pipes in a multiple concentric pipe configuration, multiple transmitter-receiver spacing, and frequencies may be used. For example, short spaced transmitters 102 and receivers 104 may be sensitive to pipe string 138, while long spaced transmitters 102 and receivers 104 may be sensitive to deeper pipes (i.e. first casing 124, second casing 136, etc.). By analyzing the signal levels at these different channels through a process of inversion, it may be possible to relate a certain received signal set to a certain set of metal loss or gain at each pipe. In examples, there may be factors that complicate the interpretation and/or identification of collars 132 and/or anomalies 200 (e.g., defects).

For example, due to eddy current physics and electromagnetic attenuation, pipes disposed in pipe string 138 (e.g., referring to FIG. 1 and FIG. 2) may generate an electrical signal that may be in the opposite polarity to the incident signal and results in a reduction in the received signal. Generally, as metal volume increases the signal loss may increase. As a result, by inspecting the signal gains, it may be possible to identify zones with metal loss (such as corrosion). In order to distinguish signals that originate from anomalies 200 (e.g., defects) at different pipes of a multiple nested pipe configuration, multiple transmitter-receiver spacing, and frequencies may be used. For example, short spaced transmitters 102 and receivers 104 may be sensitive to first pipe string 138 (e.g., referring to FIG. 2), while long spaced transmitters 102 and receivers 104 can be sensitive to deeper ($2^{nd}$, $3^{rd}$, etc.) pipes (i.e. first casing 134 and second casing 136).

Analyzing the signal levels at different channels with an inversion scheme, it may be possible to relate a certain received signal to a certain metal loss or gain at each pipe. In addition to loss of metal, other pipe properties such as magnetic permeability and electrical conductivity may also be estimated by inversion. There may be several factors that complicate interpretation of losses: (1) deep pipe signals may be significantly lower than other signals; (2) double dip indications appear for long spaced transmitters 102 and receivers 104; (3) Spatial spread of long spaced transmitter-receiver signal for a collar 132 may be long (up to 6 feet); (4) To accurately estimate of individual pipe thickness, the material properties of the pipes (such as magnetic permeability and electrical conductivity) may need to be known with fair accuracy; (5) inversion may be a non-unique process, which means that multiple solutions to the same problem may be obtained and a solution which may be most physically reasonable may be chosen. Due to these complications, an advanced algorithm or workflow may be used to accurately inspect pipe features, for example when more than two pipes may be present in pipe string 138.

Figure 3A:
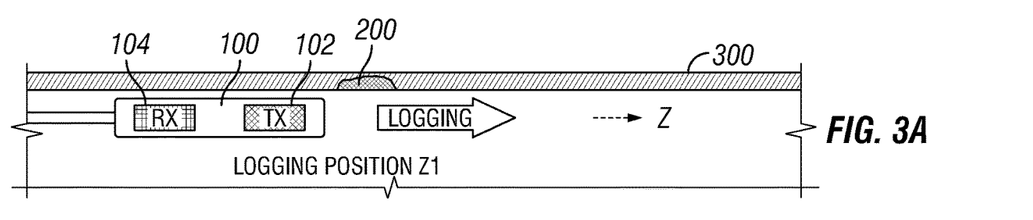
FIG. 3A illustrates an example of an EM logging tool traversing a wellbore.
Figure 3B:
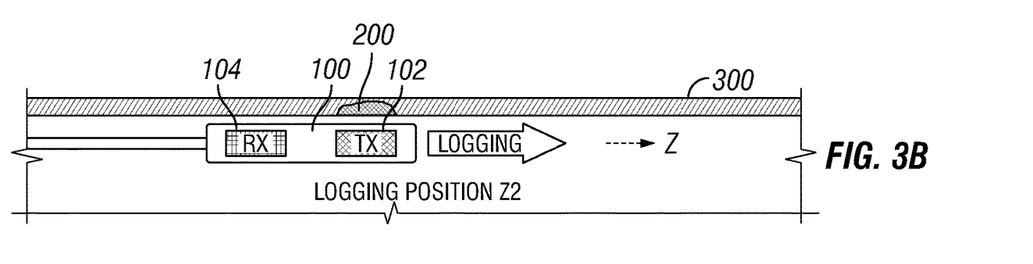
FIG. 3B illustrates another example of an EM logging tool traversing a wellbore.
Figure 3C:
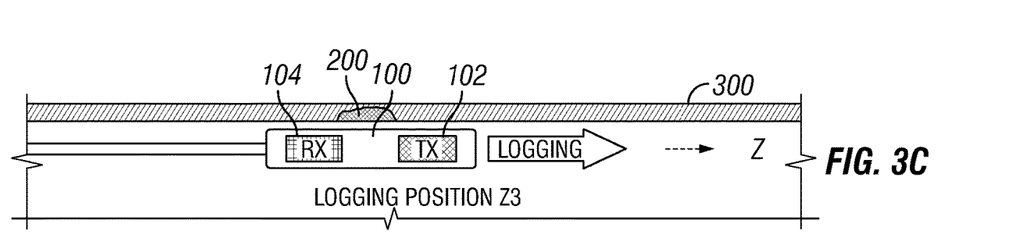
FIG. 3C illustrates another example of an EM logging tool traversing a wellbore.
Figure 3D:
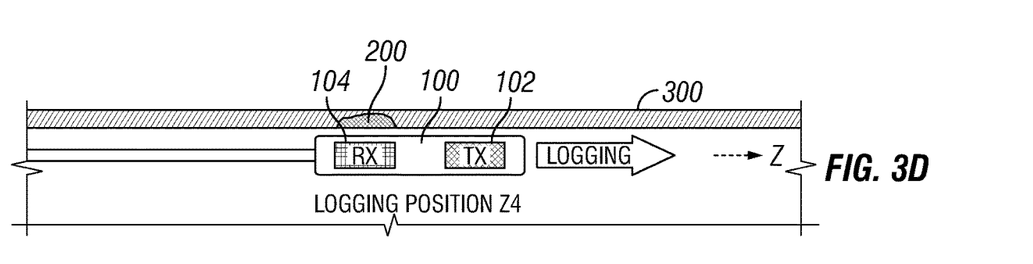
FIG. 3D illustrates another example of an EM logging tool traversing a wellbore.
Figure 3E:
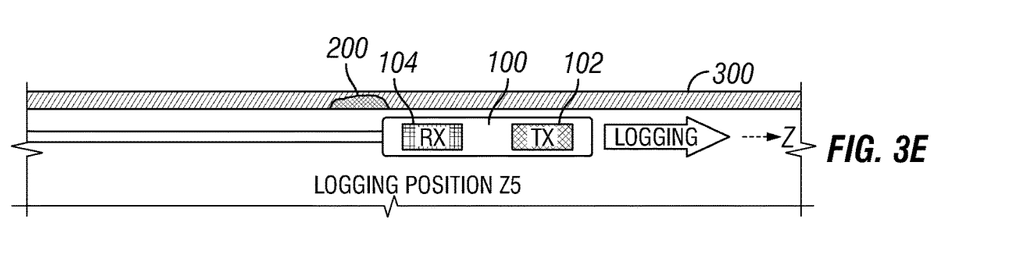
FIG. 3E illustrates another example of an EM logging tool traversing a wellbore.

During logging operations as EM logging tool 100 traverses across pipe 300 (e.g., Referring to FIG. 3), an EM log of the received signals may be produced and analyzed. The EM log may be calibrated prior to running inversion to account for the deviations between measurement and simulation (forward model). The deviations may arise from several factors, including the nonlinear behavior of the magnetic core, magnetization of pipes, mandrel effect, and inaccurate well plans. Multiplicative coefficients and constant factors may be applied, either together or individually, to the measured EM log for this calibration.

Figure 4:
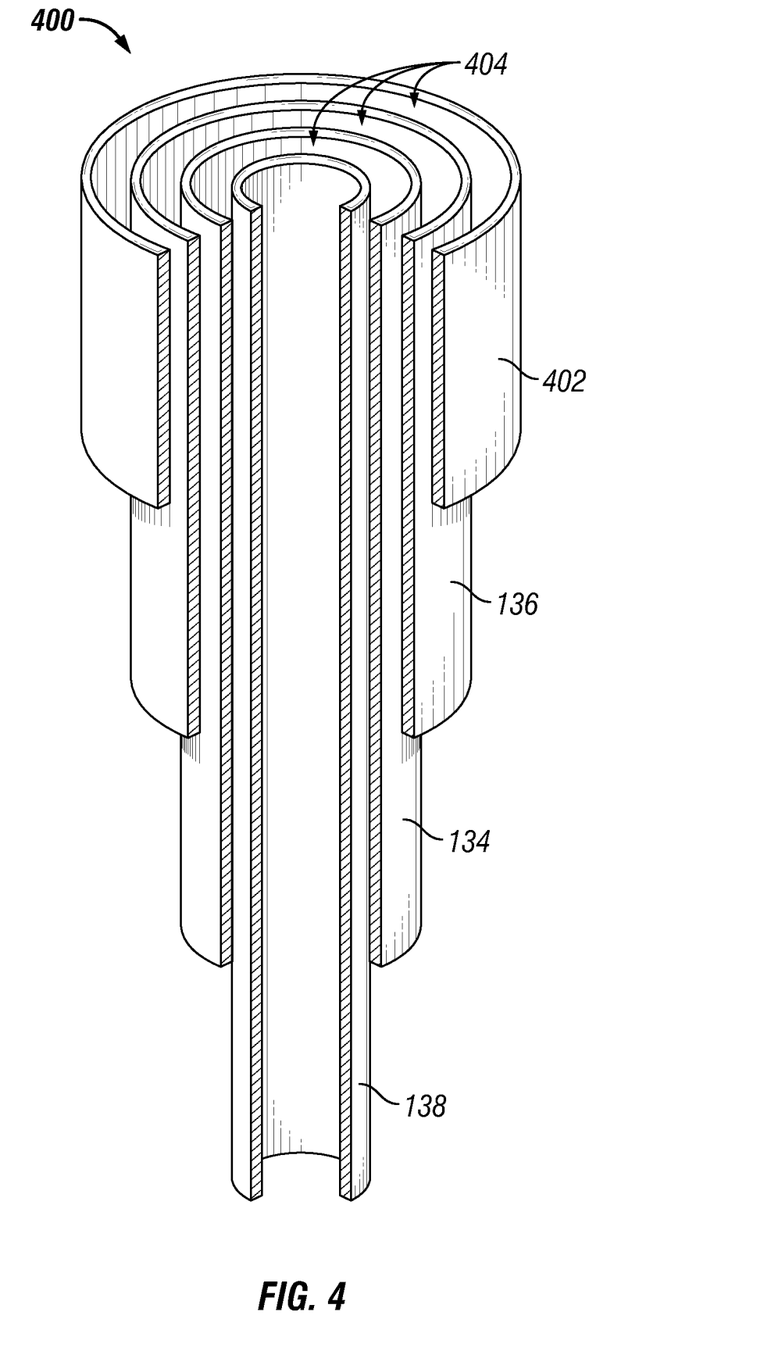
FIG. 4 illustrates an example of a well plan.

FIG. 4 illustrates an example of a well plan 400 in accordance with some embodiments. Depending on the design of well plan 400, well construction may have between two and four main components. These components include conductor, surface, intermediate and production casings. After completion of the well, a tubing may be inserted to pump hydrocarbon products. In this example, well plan 400 may comprise pipe string 138, first casing 134, second casing 136, a conductor casing 402, and wherein cement may be disposed in annulus 404 between each casing. However, it should be noted that well plan 400 may include any number of pipes, casings, tubulars, and/or the link. Well plan 400 is not limited or bound by the four pipes that are displayed in FIG. 4. When the EM logging tool 100 is used to monitor the pipe condition a log may be produced. The log may be affected by many factors, for instance, the pipe electrical properties and pipe geometry including number, size, and shape. Additionally, the number of casings may be one of the most influential factors that may impact the signal level. The signal level change may provide information to interpret the EM log for better pipe inspection. The nominal signals corresponding to each zone with known pipe configuration may be extracted to analyze the characteristics of individual pipe properties.

Figure 5:
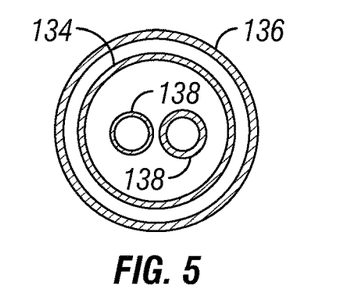
FIG. 5 illustrates a top view of an example wellbore with two non-nested pipes.
Figure 6:
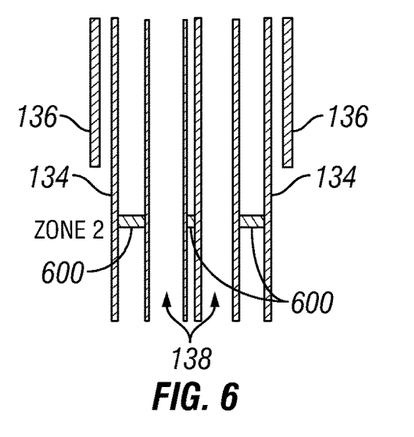
FIG. 6 illustrates a side view of an example wellbore with the two non-nested pipes.
Figure 7:
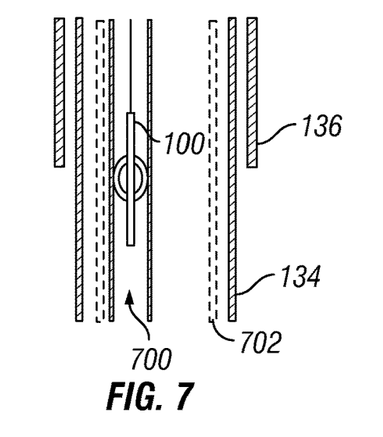
FIG. 7 illustrates a side view of the wellbore of FIG. 6 with an EM logging tool in one of the two non-nested pipes.
Figure 8:
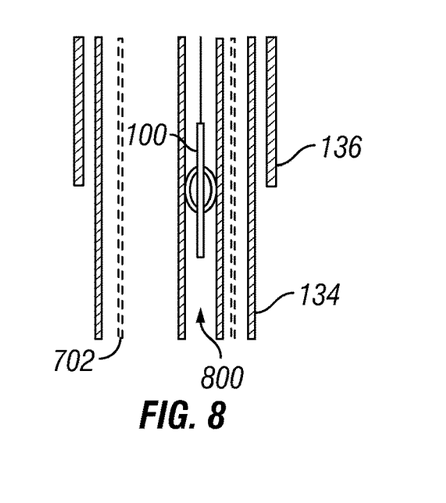
FIG. 8 illustrates a side view of the wellbore of FIG. 6 with an EM logging tool in the second of the two non-nested pipes.

FIG. 5 illustrates an example of a well with non-nested pipes from a top view of the wellbore. Non-nested pipes are defined as having two or more pipe strings 138 disposed within at least one casing, as illustrated in FIG. 5, two pipe strings 138 are disposed within a first casing 134 and a second casing 136. FIG. 6 illustrates a cut-away side view of non-nested pipes in accordance with some embodiments. As illustrated two pipe strings 138 are separated and held in place by one or more packers 600. To identify defects within first casing 134 and second casing 136, or any casing, EM logging tool 100 is disposed in a first pipe string 700, as illustrated in FIG. 7, in accordance with some embodiments. EM logging tool 100 then performs corrosion detection operations within first pipe string 700. As illustrated in FIG. 8, EM logging tool 100 is then disposed in pipe string 800 and corrosion detection operations are performed in second pipe string 800 in accordance with some embodiments. During each logging operation a modeled pipe 702, referring to FIGS. 7 and 8, is created and accounts for electromagnetic loading from each pipe string 138 in which EM logging tool 100 is not disposed in during logging operations. As there may be multiple logging operations, there may be a modeled pipe 702 created for each logging operation. To identifying one or more defects within each pipe string 138, first casing 134, second casing 136, or any casings a two dimensional ("2-D") numerical model (e.g. finite element method) is created when EM logging tool 100 is run inside each pipe string 138. As discussed below, the proposed method may allow for modeling the non-axisymmetric 2-D problem as two radial one dimensional ("1-D") problems with two mathematically equivalent pipes that account for the signals from the adjacent non-nested tubing.

Figure 9:
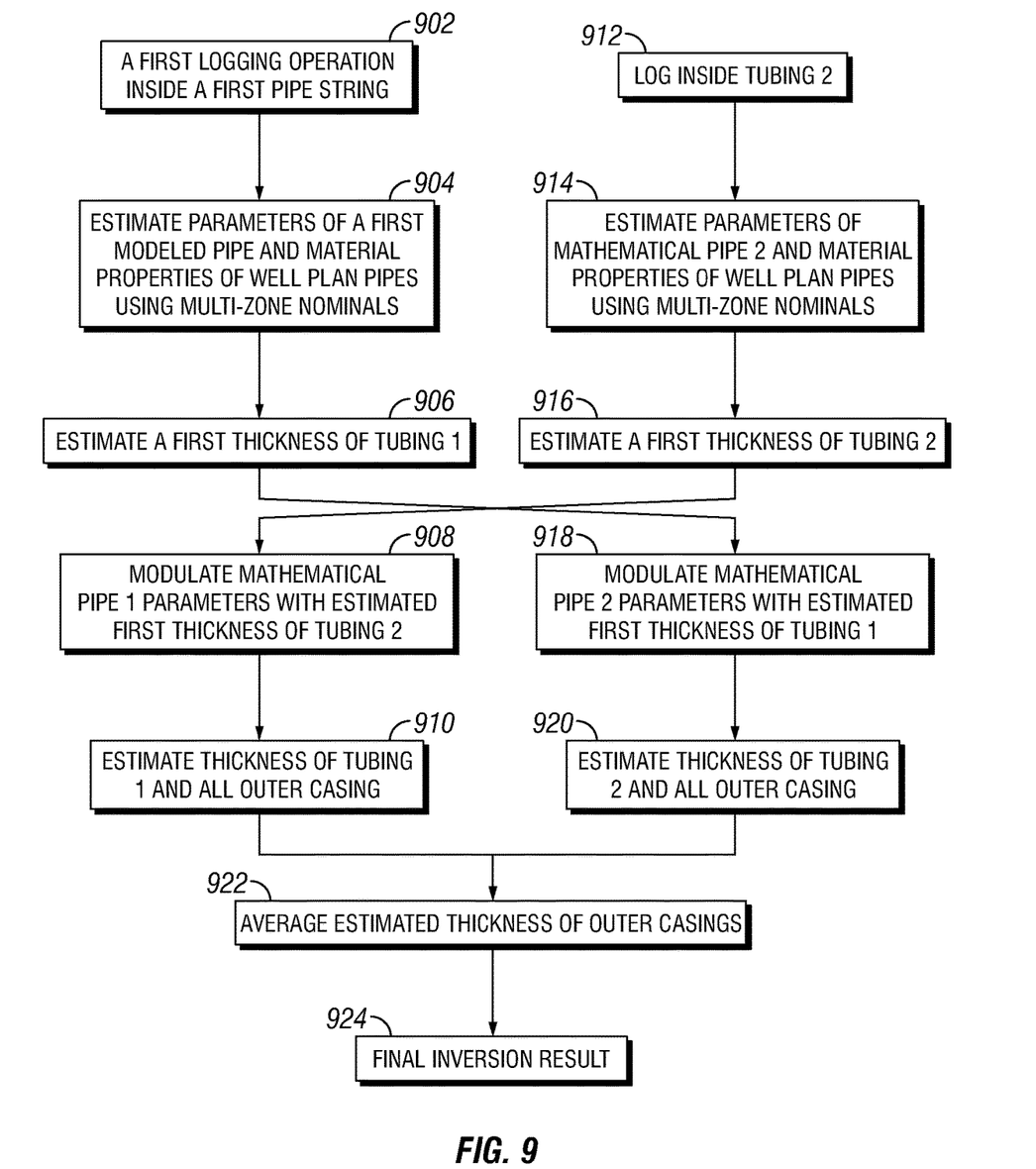
FIG. 9 is an example of a workflow for a radial 1-D inversion in dual completion wells.

FIG. 9 illustrates a workflow 900 for radial 1-D inversion in dual completion wells in accordance with some embodiments. As illustrated in FIG. 9, workflow 900 may begin with block 902 with a first logging operation inside a first pipe string 700 (e.g., referring to FIG. 7). During logging operations in first pip string 700, multi-channel measurements are taken with EM logging tool 100. The multi-channel measurements are either in the frequency-domain with multi-frequency and multi-spacing receivers or in the time-domain with different sizes and different time delays, as described above. Evaluating the material properties and the individual thicknesses of any pipe string 138, first casing 134, second casing 136 (e.g., referring to FIG. 6), or a casing, a log is formed from the multi-channel measurements taken by EM logging tool 100. The measurements taken in first pipe string 700 are recorded as a log for further processing.

Block 904 may estimate parameters of a first modeled pipe, for example modeled pipe 702 discussed above, and material properties of well plan pipes using multi-zone nominals. In examples a radial 1-D model is used. The radial 1-D model may be semi-analytical or numerical. Model parameters to be estimated include the material properties of the well plan pipes, e.g. magnetic permeability and electrical conductivity, as well as the properties of the first modeled pipe inserted in the radial 1-D model between first pipe string 700 (e.g., referring to FIG. 7) and EM logging tool 100 (e.g., referring to FIG. 7) and first casing 134 so as to minimize the mismatch between a synthetic model and the measurements at one or more calibration points. The synthetic model is a model of nested pipes based at least in part on the well plan. For example, the synthetic model includes estimated and/or ideal parameters, properties, and/or characteristics of each pipe disposed within a wellbore. The synthetic model may be considered a forward model which may be compared to the modeled pipe 702, discussed below.

In examples, properties of modeled pipe 702 may include the outer/inner diameter, thickness, magnetic permeability, electrical conductivity and eccentricity. The calibration point within a given well plan zone is the statistical mode of the measured log and corresponds to the nominal properties of the pipes as given by the well plan. Well plan zones are defined as depth ranges over which the pipe configuration is invariant, for example, no change in the number of pipes, their individual weights, or their individual inner diameters.

In block 906 an operation is performed to estimate a first thickness profile of first pipe string 700 (e.g., referring to FIG. 7). A preliminary estimate of the thickness profile of first pipe string 700 may be obtained using high-frequency short-spacing channels. The thicknesses of other pipes, such as first casing 134, second casing 136, and/or the like, may be constrained to their nominal values (as provided by the well plan) during this operation.

After estimating a first thickness profile in block 906 in block 908 an operation to module modeled pipe 702 (e.g., referring to FIG. 7) parameters with the estimated thickness of second pipe string 800 (e.g., referring to FIG. 8) is performed. In examples, the estimated thickness of second pipe string 800, which is found below, may be used to modulate the parameters (e.g. thickness profile) of modeled pipe 702 incorporated in the model from logging operations.

As illustrated in workflow 900, blocks 906 and 908 may not be performed until after logging operations may be performed on both first pipe string 700 and second pipe string 800 (e.g., referring to FIGS. 7 and 8, respectfully). In examples, from block 904, block 910 may be performed to estimate thickness of first pipe string 700 and all outer casings, such as first casing 134, second casing 136, and/or the like. Using the constructed model, inversion is run for each one of the logs (run inside each tubing) to obtain estimates of the individual thicknesses of each tubing and casings.

In block 910, a radial 1-D equivalent model is built and used to invert the acquired measurements. The model includes nested modeled pipe 702, which does not exist in the actual well plan, inserted between first pipe string 700 or second pipe string 800, discussed below, and the innermost casing, for example first casing 134, to account for the electromagnetic loading from the adjacent tubing. The properties of modeled pipe 702 $x_{math}$ along with the material properties of the well plan pipes p and a are determined through minimizing the mismatch between measured and synthetic zone nominals as follows:

$$[\mu, \sigma, x_{math}] = \operatorname{argmin}\{\|s|x_{nom}, \mu, \sigma, x_{math}| - |W_{cal} m_{nom}\|^2\} \quad (6)$$

where $\mu$ is the sets of magnetic permeability and $\sigma$ is the electrical conductivity respectively of the well plan pipes. Additionally, $x_{math}$ is the set of modeled pipes 702 properties that may include the outer/inner diameter, thickness, magnetic permeability, electrical conductivity and eccentricity. Variables further defined are $x_{nom}$ which is the set of pipe nominals in each one of the well plan zones as provided by the well plan, for example:

$$x_{nom} = [t1,1 \ldots ,t1,Np1, ecc1, t2,1 \ldots ,t2,Np2, ecc2 \ldots ] \quad (7)$$

wherein $t_{i,j}$ is the nominal thickness of nested pipe j in zone i, $N_{pi}$ is the total number of nested pipes in zone i. Additionally, ecce is the nominal eccentricity of a given tubing (e.g., first pipe string 700 or second pipe string 800) which may be calculated from the structure of the packer that holds the two or more tubing as reported in the well plan. Further, $s(x_{nom}, \mu, \sigma, x_{math})$ is the set of synthetic (modeled) responses at the zone nominal, $W_{cal}$ is a set of multiplicative calibration coefficients, and $m_{nom}$ is the set of measured zone nominal.

Figure 10:
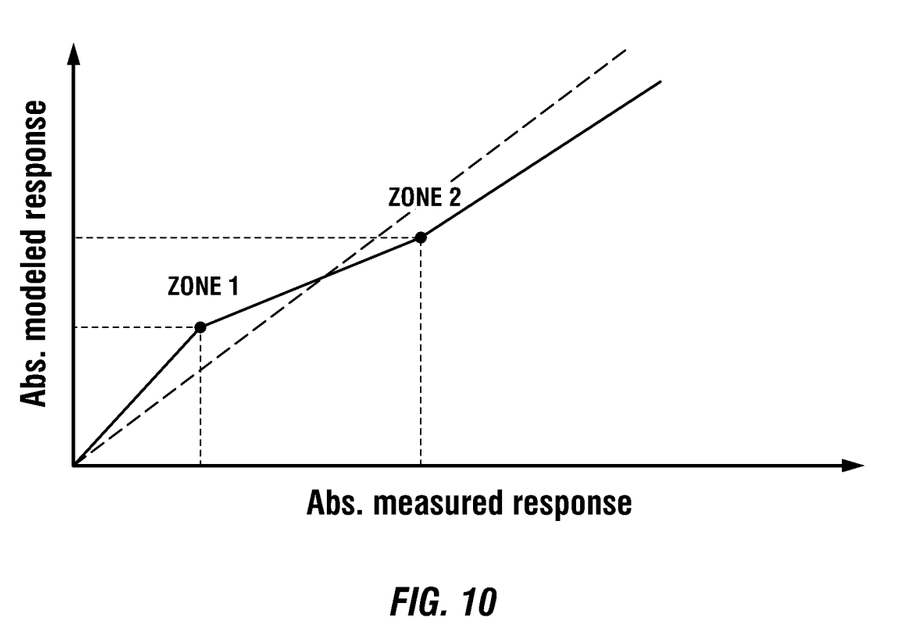
FIG. 10 illustrates a graph of a cross-plot of a synthetic model in view of a measured zone nominals for one or more channels of the EM logging tool.

FIG. 10 is a graph illustrating a cross-plot of the synthetic (modeled) versus the measured zone nominals for one of the channels in accordance with some embodiments. In the absence of multiple well plan zones, a free-space measurement with EM logging tool 100 (e.g., referring to FIG. 6) may serve as a second calibration point. The modeled pipe 702 properties (e.g., OD, thickness, magnetic permeability, electrical conductivity) along with the material properties of the well plan pipes (magnetic permeability and electrical conductivity) are optimized so as to minimize the residual of the linear fit to a straight line that passes through the origin.

Blocks 902 through 910 may be performed for first pipe string 700 (e.g., referring to FIG. 7) during a logging operation performed by EM logging tool 100. To determine a radial 1-D inversion in dual completion wells a second logging operations is performed by EM logging tool 100 in second pipe string 800 (e.g., referring to FIG. 8). Logging operations in each casing string 138 (e.g., referring to FIG. 6) must be performed to determine the radial 1-D inversion in dual completion wells.

Thus, blocks 912 through 920 describe a second logging operations that is similar to the first logging operation performed in blocks 902 through 910. Second logging operation may begin with block 912 with a second logging operation inside a second pipe string 800 (e.g., referring to FIG. 8). During logging operations in second pipe string 800, multi-channel measurements are taken with EM logging tool 100. The multi-channel measurements are either in the frequency-domain with multi-frequency and multi-spacing receivers or in the time-domain with different sizes and different time delays, as described above. Evaluating the material properties and the individual thicknesses of any pipe string 138, first casing 134, second casing 136 (e.g., referring to FIG. 6), or a casing, a log is formed from the multi-channel measurements taken by EM logging tool 100. The measurements taken in second pipe string 800 are recorded as a log for further processing.

Block 914 may estimate parameters of a first modeled pipe, for example modeled pipe 702 discussed above, and material properties of well plan pipes using multi-zone nominals. In examples a radial 1-D model is used. The radial 1-D model may be semi-analytical or numerical. Model parameters to be estimated include the material properties of the well plan pipes, e.g. magnetic permeability and electrical conductivity, as well as the properties of the first modeled pipe inserted in the radial 1-D model between second pipe string 800 (e.g., referring to FIG. 8) ad EM logging tool 100 (e.g., referring to FIG. 7) and first casing 134 so as to minimize the mismatch between the synthetic model and the measurements at one or more calibration points.

In examples, properties of modeled pipe 702 may include the outer/inner diameter, thickness, magnetic permeability, electrical conductivity and eccentricity. The calibration point within a given well plan zone is the statistical mode of the measured log and corresponds to the nominal properties of the pipes as given by the well plan. Well plan zones are defined as depth ranges over which the pipe configuration is invariant, for example, no change in the number of pipes, their individual weights, or their individual inner diameters.

In block 916 an operation is performed to estimate a first thickness profile of second pipe string 800 (e.g., referring to FIG. 8). A preliminary estimate of the thickness profile of second pipe string 800 may be obtained using high-frequency short-spacing channels. The thicknesses of other pipes, such as first casing 134, second casing 136, and/or the like, may be constrained to their nominal values (as provided by the well plan) during this operation.

After estimating a second thickness profile in block 916 in block 918 an operation to module modeled pipe 702 (e.g., referring to FIG. 7) parameters with the estimated thickness of first pipe 700 (e.g., referring to FIG. 7) is performed. In examples, the estimated thickness of first pipe 700, which is found above, may be used to modulate the parameters (e.g. thickness profile) of modeled pipe 702 incorporated in the model from logging operations.

As illustrated in workflow 900, blocks 916 and 918 may not be performed until after logging operations may be performed on both first pipe 700 and second pipe 800 (e.g., referring to FIGS. 7 and 8, respectfully). In examples, from block 914, block 920 may be performed to estimate thickness of second pipe 800 and all outer casings, such as first casing 134, second casing 136, and/or the like. Using the constructed model, inversion is run for each one of the logs (run inside each tubing) to obtain estimates of the individual thicknesses of each tubing and casings. Additionally, in block 920 a radial 1-D equivalent model is built and used to invert the acquired measurements. The radial 1-D equivalent model is build using Equations (6) and (7) described above.

In block 922 the average estimated thickness of out casings is determined. This may be performed by combining the estimated thickness of first pipe string 700 (e.g., referring to FIG. 7) and all outer casings from block 910 as well as the estimated thickness of second pipe string 800 (e.g., referring to FIG. 8) and all outer casings. During this operation, since as many sets of outer casings thickness estimates as the number logs inside different non-nested tubing may be obtained, in block 924 the final estimate for the outer casings may be made by averaging out the results from the individual logs/inversion.

Improvements discussed above may include accurate characterization of non-nested pipes using an equivalent radial 1-D forward model in lieu of a 2-D model. The equivalent model is built by adding a mathematical pipe that accounts for the signals (electromagnetic loading) from the adjacent non-nested tubulars. This method and system for determining corrosion along a tubular in a wellbore may include any of the various features of the compositions, methods, and system disclosed herein, including one or more of the following statements.

Statement 1: A method for estimating parameters of pipes may comprise disposing an electromagnetic (EM) logging tool into a pipe string, creating a log from a first set of one or more measurements taken by the EM logging tool in the pipe string, creating a synthetic model of one or more nested pipes based at least in part on a well plan, adding a modeled pipe to the synthetic model, estimating one or more parameters of the modeled pipe through model calibration to form a calibrated model, and performing an inversion with the calibrated model to estimate one or more pipe parameters of the pipe string.

Statement 2: The method of statement 1, further comprising disposing the EM logging tool into a second pipe string, wherein the second pipe string and the pipe staring are at least partially encircled by a casing and creating a second log from a second set of one or more measurements taken by the EM logging tool in the second pipe string.

Statement 3: The method of statement 2, further comprising inverting the one or more parameters of the modeled pipe to identify a thickness of the pipe string, the second pipe string, and the casing and averaging the thickness of the one or more casings.

Statement 4. The method of statements 1 or 2, wherein the inversion minimizes a misfit between the calibrated model and measurements at a given depth.

Statement 5. The method of statements 1, 2, or 4, further comprising identifying integrity of the casing from a thickness.

Statement 6. The method of statements 1, 2, 4, or 5, wherein the one or more measurements are multi-channel measurements.

Statement 7. The method of statement 6, wherein the multi-channel measurements are multi-frequency and multi-spacing measurements.

Statement 8. The method of statements 1, 2, or 4-6, wherein the EM logging tool is a frequency domain tool or a time-domain tool.

Statement 9. The method of statements 1, 2, 4-6, or 8, wherein the one or more parameters include thickness, percentage metal loss or gain, magnetic permeability, electrical conductivity, eccentricity, and inner diameter.

Statement 10. The method of statements 1, 2, 4-6, 8, or 9, wherein the estimating one or more parameters is performed at one or more calibration points.

Statement 11. The method of statement 10, wherein one or more data points are used at the one or more calibration points that correspond to one or more nominal properties of the pipe string.

Statement 12. The method of statement 11, wherein the one or more calibration points correspond to different pipe zones.

Statement 13. The method of statement 12, wherein one of the pipe zones is free space.

Statement 14. A system estimating parameters of two non-nested pipes may comprise an electromagnetic logging tool. The electromagnetic logging tool may comprise a transmitter, wherein the transmitter is a first coil and is operable to transmit an electromagnetic field, and a receiver, wherein the receiver is a second coil and is operable to measure the electromagnetic field. The system may further comprise an information handling system configured to create a multi-channel log from a first set of one or more measurements taken by the EM logging tool in the pipe string, add a modeled pipe to a synthetic model, wherein the synthetic model is of one or more nested pipes based at least in part on a well plan, estimate one or more parameters of the modeled pipe through model calibration to form a calibrated model, and perform an inversion with the calibrated model to estimate one or more pipe parameters of the pipe string.

Statement 15. The system of statement 14, wherein the information handling system is further configured to create a second multi-channel log from a second set of one or more measurements taken by the EM logging tool in a second pipe string.

Statement 16. The system of statement 15, wherein the information handling system is further configured to invert the one or more parameters of the modeled pipe to identify a thickness of the pipe string, the second pipe string, and a casing and averaging the thickness of the casing.

Statement 17. The system of statement 16, wherein the inversion minimizes a misfit between the calibrated model and measurements at a given depth.

Statement 18. The system of statement 16, wherein the information handling system is further configured to identify integrity of the casing from the thickness.

Statement 19. The system of statement 14 or 15, wherein the one or more parameters include thickness, percentage metal loss or gain, magnetic permeability, electrical conductivity, eccentricity, and inner diameter.

Statement 20. The system of statement 19, wherein the multi-channel measurements are multi-frequency and multi-spacing measurements.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for estimating parameters of pipes in a pipe string comprising:
   disposing an electromagnetic (EM) logging tool into the pipe string;
   creating a log from a first set of measurements taken by the EM logging tool in the pipe string;
   creating a synthetic model of one or more nested pipes in the pipe string based at least in part on a well plan;
   adding a modeled pipe to the synthetic model;
   estimating one or more parameters of the modeled pipe; and
   performing an inversion with the modeled pipe to estimate one or more pipe parameters of the pipe string.

2. The method of claim 1, further comprising disposing the EM logging tool into a second pipe string, wherein the second pipe string and the pipe string are at least partially encircled by one or more casings and creating a second log from a second set of measurements taken by the EM logging tool in the second pipe string.

3. The method of claim 2, further comprising inverting the one or more parameters of the modeled pipe to identify a thickness of the pipe string, the second pipe string, and the one or more casings and averaging the thickness of the one or more casings.

4. The method of claim 1, wherein the inversion minimizes a misfit between the modeled pipe and measurements at a given depth.

5. The method of claim 1, further comprising identifying integrity of a casing from a thickness.

6. The method of claim 1, wherein the measurements are multi-channel measurements.

7. The method of claim 6, wherein the multi-channel measurements are multi-frequency and multi-spacing measurements.

8. The method of claim 1, wherein the EM logging tool is a frequency domain tool or a time-domain tool.

9. The method of claim 1, wherein the one or more parameters include thickness, percentage metal loss or gain, magnetic permeability, electrical conductivity, eccentricity, and inner diameter.

10. The method of claim 1, wherein the estimating one or more parameters is performed at one or more calibration points.

11. The method of claim 10, wherein one or more data points are used at the one or more calibration points that correspond to one or more nominal properties of the pipe string.

12. The method of claim 11, wherein the one or more calibration points correspond to different pipe zones.

13. The method of claim 12, wherein one of the pipe zones is free space.

14. A system for estimating parameters of pipes in a pipe string comprising:
   an electromagnetic logging tool, wherein the electromagnetic (EM) logging tool comprises:
      a transmitter, wherein the transmitter is a first coil and transmits an electromagnetic field;
      a receiver, wherein the receiver is a second coil and measures the electromagnetic field; and
   an information handling system, wherein the information handling system:
      creates a multi-channel log from a first set of measurements taken by the EM logging tool in the pipe string;
      adds a modeled pipe to a synthetic model, wherein the synthetic model is of one or more nested pipes in the pipe string based at least in part on a well plan;
      estimates one or more parameters of the modeled pipe; and
      performs an inversion with the modeled pipe to estimate one or more pipe parameters of the pipe string.

15. The system of claim 14, wherein the information handling system further creates a second multi-channel log from a second set of measurements taken by the EM logging tool in a second pipe string.

16. The system of claim 15, wherein the information handling system further inverts the one or more parameters of the modeled pipe to identify a thickness of the pipe string, the second pipe string, and a casing and averaging the thickness of the casing.

17. The system of claim 16, wherein the inversion minimizes a misfit between the modeled pipe and measurements at a given depth.

18. The system of claim 16, wherein the information handling system is further identifies integrity of the casing from the thickness.

19. The system of claim 14, wherein the one or more parameters include thickness, percentage metal loss or gain, magnetic permeability, electrical conductivity, eccentricity, and inner diameter.

20. The system of claim 19, wherein the multi-channel log comprises multi-frequency and multi-spacing measurements.

* * * * *